(12) United States Patent  
Münzenberg et al.

(10) Patent No.: US 8,586,063 B2
(45) Date of Patent: Nov. 19, 2013

(54) THICKENERS

(75) Inventors: Cindy Münzenberg, Düsseldorf (DE); Helena Wiethoff, Düsseldorf (DE)

(73) Assignee: Cognis IP Management GmbH, Duesseldorf (DE)

( * ) Notice: Subject to any disclaimer, the term of this patent is extended or adjusted under 35 U.S.C. 154(b) by 389 days.

(21) Appl. No.: 12/896,316

(22) Filed: Oct. 1, 2010

(65) Prior Publication Data

US 2011/0082219 A1    Apr. 7, 2011

(30) Foreign Application Priority Data

Oct. 2, 2009  (EP) .................................... 09012497

(51) Int. Cl.
- *C08G 59/18* (2006.01)
- *C08G 65/34* (2006.01)
- *C08G 71/04* (2006.01)

(52) U.S. Cl.
USPC ............................ 424/400; 528/368; 528/422

(58) Field of Classification Search
USPC .................................................. 528/368, 422
See application file for complete search history.

(56) References Cited

U.S. PATENT DOCUMENTS

| | | | |
|---|---|---|---|
| 4,079,028 A | 3/1978 | Emmons et al. | 260/29.6 |
| 5,723,653 A | 3/1998 | Santhanam | 560/196 |
| 2006/0155021 A1 | 7/2006 | Lenges et al. | |

OTHER PUBLICATIONS

Bar-Shir et al. (Journal of Organic Chemistry, 70, published 2005, pp. 2660-2666).*
European Search Report, Mar. 3, 2010.

* cited by examiner

*Primary Examiner* — Richard Schnizer
*Assistant Examiner* — Alma Pipic
(74) *Attorney, Agent, or Firm* — Servilla Whitney LLC

(57) ABSTRACT

Disclosed are compounds obtained by reacting (a) epoxides (I) which comprise at least two epoxide groups per molecule, with (b) compounds of the structure (II), having substituents as defined, (II)

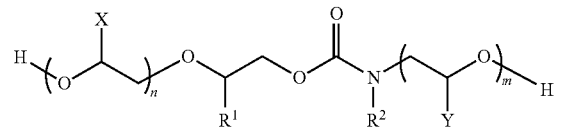

and (c) optionally, alcohols (III) of the formula $R^4$—OH, wherein $R^4$ is C6-C22 alkyl, with the proviso that the molar ratio of the reactants (I):(II):(III) is in the range from 1:(1 to 3):(0.05 to 1.95). These compounds are useful as thickeners, and may be prepared as thickener concentrates.

6 Claims, No Drawings

THICKENERS

CROSS-REFERENCE TO RELATED APPLICATIONS

The present application claims priority under 35 USC §119 to European Patent Application number 09012497.5, filed Oct. 2, 2009, which is incorporated herein in its entirety.

FIELD OF THE INVENTION

The invention relates to specific alkoxylated urethanes and to their use as thickeners.

BACKGROUND OF THE INVENTION

Urethanes are conventionally produced by reacting alcohols with isocyanates. The characteristic of this substance class, i.e. of the urethanes, is the urethane functional group —O—CO—NH—. An alternative method for generating urethane groups is the reaction of a cyclic carbonate with a primary amine. The particular feature of this synthesis route to urethanes consists in the fact that it is possible to eliminate the use of isocyanates as raw materials. The person skilled in the art would refer to urethanes which are accessible via the last-mentioned synthesis route as "non-isocyanate urethanes" (NIUs).

Associative thickeners based on polyurethane are linear or branched, nonionic polymers with hydrophilic and hydrophobic segments. To an increasing extent, they supplement or substitute for the cellulose ethers and alkali-soluble polyacrylates traditionally used as thickeners in paints and coatings. Compared with these, the polyurethane thickeners have the following advantages: lower viscosity upon incorporation, lower spray tendency upon spreading, better color flow, higher shine as a result of less flocculation, lower sensitivity of the coatings to water, lower susceptibility to microbial attack, low intrinsic viscosity of the formulated material and good meterability resulting therefrom, high thickening effect in the dispersions to be thickened, lowest possible drop in viscosity of the thickened dispersions under shear, and approximately Newtonian flow behavior.

Polyurethane solutions or dispersions in water-dilutable aqueous or predominantly aqueous phase are referred to by the person skilled in the art as HEUR thickeners (the acronym HEUR is derived from "nonionic hydrophobically modified ethylene oxide urethane block copolymer"), and have already been used for a relatively long time in highly diverse fields of application for thickening water-based emulsion paints. The thickeners fundamentally described in U.S. Pat. No. 4,079,028 are composed of linear and/or branched polyethylene glycol blocks and hydrophobic segments which are generally linked together via urethane groups.

Although not wishing to be bound by any particular theory, the mechanism of action of such thickeners is assumed to be that the polyethylene glycol segments ensure the water compatibility, and the hydrophobic segments construct a viscosity-imparting three-dimensional molecular network via an association with one another and also with dispersed binder particles of the emulsion paint to be thickened therein.

Preferred hydrophobic starting materials are relatively long-chain, generally monofunctional alcohols, such as, for example, n-octanol, n-dodecanol, isotridecyl alcohol or isononylphenol. These alcohols are employed predominantly as they are, but may also be used in the form of their addition products with a few equivalents of ethylene oxide. The polyfunctional isocyanates used are generally difunctional, such as, for example, methylenebis(4-cyclohexyl) diisocyanate, m/p-tetramethylene-xylylene diisocyanate, hexamethylene diisocyanate, 2,4-tolylene diisocyanate, trimethylhexamethylene diisocyanate and 4/2,4'-diphenyl-methane diisocyanate. The polyethylene glycols used are generally likewise difunctional, and have molecular weights in the region of a few thousand daltons, for example 4500 or 10000 daltons.

SUMMARY OF THE INVENTION

It was an object of the invention to provide thickeners which have the beneficial application properties of polyurethane thickeners. However, the thickeners to be developed should be isocyanate-free.

DETAILED DESCRIPTION OF PREFERRED EMBODIMENTS

One embodiment of the invention provides compounds (V) obtained by reacting:
(a) epoxides (I) which comprise at least two epoxide groups per molecule with
(b) compounds of the structure (II)

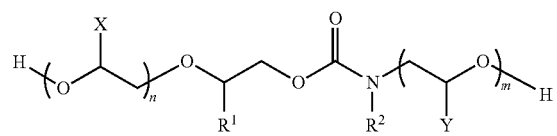

in which:
$R^1$ is hydrogen, an alkyl group having 1 to 3 carbon atoms, or $R^3$,
$R^2$ is an alkyl group having 2 to 22 carbon atoms, which may be linear or branched or cyclic, and also may be saturated or olefinically mono- or polyunsaturated,
$R^3$ is a saturated alkyl group having 1 to 3 carbon atoms, which is further substituted on one of the carbon atoms with the group —O—$(CH_2—CHZ—O)_p$—H,
X, Y and Z, independently are hydrogen or methyl,
n, m and p, independently are numbers in the range from 0 to 45, with the proviso that at least one of the indices n, m and p must be greater than zero, and the further proviso that the sum n+m+p must be in the range from 2 to 70, and
(c) optionally, alcohols (III) of the formula $R^4$—OH, in which $R^4$ is an alkyl group having 6 to 22 carbon atoms,
with the proviso that the molar ratio of the reactants (I):(II):(III) is in the range from 1:(1 to 3):(0.05 to 1.95).

The present invention further provides the use of compounds (V) as thickeners, where the compounds (V) are obtained by reacting:
(a) epoxides (I) which comprise at least two epoxide groups per molecule with
(b) compounds of the structure (II)

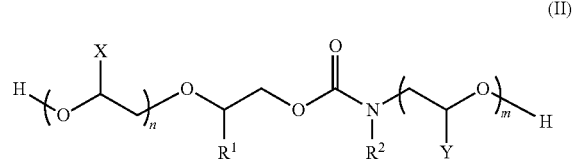

in which:
- R¹ is hydrogen, an alkyl group having 1 to 3 carbon atoms, or R³,
- R² is an alkyl group having 2 to 22 carbon atoms, which may be linear or branched or cyclic, and also may be saturated or olefinically mono- or polyunsaturated,
- R³ is a saturated alkyl group having 1 to 3 carbon atoms, which is further substituted on one of the carbon atoms with the group —O—(CH₂—CHZ—O)$_p$—H,
- X, Y and Z, independently are hydrogen or methyl,
- n, m and p, independently are numbers in the range from 0 to 45, with the proviso that at least one of the indices n, m and p must be greater than zero, and the further proviso that the sum n+m+p must be in the range from 2 to 70, and (c) optionally, alcohols (III) of the formula R⁴—OH, in which R⁴ is an alkyl group having 6 to 22 carbon atoms,
with the proviso that the molar ratio of the reactants (I):(II):(III) is in the range from 1:(1 to 3):(0.05 to 1.95).

In another embodiment, the invention provides the use of compounds (V) as thickeners, where the compounds (V) are obtained by reacting:
(a) epoxides (I) which comprise at least two epoxide groups per molecule with
(b) compounds of the structure (II)

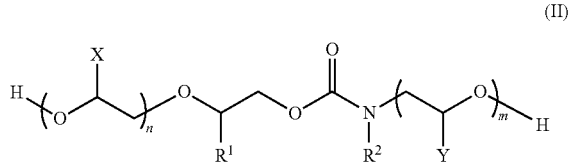

(II)

in which:
- R¹ is hydrogen, an alkyl group having 1 to 3 carbon atoms, or R³,
- R² is an alkyl group having 2 to 22 carbon atoms, which may be linear or branched or cyclic, and also may be saturated or olefinically mono- or polyunsaturated,
- R³ is a saturated alkyl group having 1 to 3 carbon atoms, where this alkyl group is substituted on one of the carbon atoms with the group —O—(CH₂—CHZ—O)$_p$—H,
- X, Y and Z, independently are hydrogen or methyl,
- n, m and p, independently are numbers in the range from 0 to 45, with the proviso that at least one of the indices n, m and p must be greater than zero, and the further proviso that the sum n+m+p must be in the range from 2 to 70, with the proviso that the molar ratio of the reactants (I):(II) is in the range from 1:(1 to 3). Preferably, the molar ratio of the reactants (I):(II) is in the range from 1:(1.05 to 1.10).
That is, optional alcohol component (c) is not present.

The compounds (V) according to the invention are nonionic compounds which are soluble or dispersible in water.

According to the invention, the compounds (V) are used as thickeners. In this connection, they are particularly suitable for thickening emulsion paints and for thickening aqueous dispersions.

EO and/or PO Building Blocks

The compounds (II) comprise structural elements —(CH₂—CHX—O)$_n$—, —(CH₂—CHY—O)$_m$— and —(CH₂—CHZ—O)$_p$—, where the above provisos apply.

The formula notation is intended to express the fact that the stated structural elements are derived from ethylene oxide (EO) or propylene oxide (PO), namely insofar as—logically in the case where the indices m, n and p are other than zero—these building blocks result, in synthetic terms, from an addition of EO or PO, or ethylene glycol or propylene glycol (for n, m, p=1) or polyaddition of EO and/or PO, or polyethylene glycol or polypropylene glycol or corresponding mixed EO-PO copolymers (for n, m, p≥2). Also, each of these structural elements—independently of one another—may be composed either exclusively of EO building blocks or exclusively of PO building blocks, or else may comprise both EO and PO building blocks in mixed form, distributed randomly or in blocks. Consequently, the formulaic representation used for the stated structural elements represents an abbreviated notation for the stated possibilities, which are obvious to a knowledgeable person skilled in the art.

Thus, for example, X═H and n=5 means that the corresponding structural element comprises five EO units linked together, which corresponds to a group —(O—CH₂—CH₂)₅—; by contrast, X═CH₃ and n=5 means that the structural element comprises five PO units linked together, which corresponds to a group —(O—CH₂—CH(CH₃))₅—, where—as is known to the person skilled in the art—the orientation of the methyl group within the structural element may be realized for each PO building block in two ways, namely as —(O—CH₂—CH(CH₃))— or —(O—CH(CH₃)—CH₂)—.

Within the context of the present invention, the formula (II) is therefore to be understood such that EO and PO building blocks may also be present simultaneously within the stated structural elements (which, logically, presupposes that the indices then each have a value of at least 2). The expression "independently" within the term "X, Y and Z, independently are hydrogen or methyl" therefore refers not only to the stated different structural elements, but also applies within one and the same structural element.

Compounds (I)

The compounds (I) are epoxides which comprise at least two epoxide groups per molecule.

Examples of suitable epoxides include, without limitation, diglycidyl ethers of diols or triglycidyl ethers of triols, especially the alcohols ethylene glycol, diethylene glycol, triethylene glycol, 1,2-propylene glycol, 1,3-propylene glycol, 1,4-butylene glycol, 1,5-pentadiol, 1,6-hexadiol, cyclohexanediol, cyclohexanedimethanol, neopentyl glycol, 1,2,6-hexanetriol, glycerol, and trimethylolpropane. Specifically, the epoxides of the POLYOX® series from UPPC (R3, R4, R5, R6, R7, R8, R9, R10, R11, R12, R14, R15, R16, R17, R18, R19, R20, R24) and 1,2-ethanediol diglycidyl ether and polytetrahydrofuran diglycidyl ether are suitable.

In one embodiment, epoxides (I) are used which comprise two epoxide groups per molecule. Preferably, these epoxides comprise the oxirane groups in terminal positions in the molecule. In another embodiment, epoxides (I) are used which comprise three epoxide groups per molecule. Preferably, these epoxides comprise the oxirane groups in terminal positions in the molecule.

It may also be desired to use different epoxides (I) in admixture with one another.

Compounds (II)

With regard to the compounds of structure (II), R² is an alkyl group having 2 to 18, and preferably 6 to 14 carbon atoms, where this group may be:

linear, branched or cyclic,
saturated, or olefinically mono- or polyunsaturated.

Examples of alkyl groups $R^2$ include, without limitation, lauryl (C12), myristyl (C14), cetyl (C16), stearyl (C18), 2-ethylhexyl.

In one preferred embodiment, the alkyl groups $R^2$ are saturated and branched. 2-Ethylhexyl is particularly preferred.

In one embodiment, $R^1$ is hydrogen.

In another embodiment, $R^1$ is an alkyl group having 1 to 3 carbon atoms.

In one embodiment, each of X, Y and Z is hydrogen.

In one embodiment, the sum n+m+p is in the range from 5 to 50, and in particular from 10 to 25.

In one embodiment, the following applies: $R^1$ is hydrogen; $R^2$ is a saturated, branched alkyl group; X, Y and Z are hydrogen; the sum n+m+p is in the range from 5 to 50, and in particular from 10 to 25. Logically, for this embodiment the index p has the value zero.

In another embodiment, the following applies: $R^1$ is $R^3$, where $R^3$ is $CH_2OH$; $R^2$ is a saturated, branched alkyl group; X, Y and Z are hydrogen; the sum n+m+p is in the range from 5 to 50, and in particular from 10 to 25.

In one embodiment, n and m independently are numbers in the range from 1 to 45, in particular 3 to 45, preferably 5 to 45, and particularly preferably 10 to 45.

The compounds (II) can be prepared, for example, as follows. Cyclic carbonates (1 mol) are reacted with an excess of amine (1.01 to 5 mol, preferably 1.05 to 2.5 mol). Preferably, the amine is introduced as initial charge, in particular at about 45° C., and the cyclic carbonate is added dropwise, in which case the temperature during the reaction should not exceed about 90° C. Preferably, the reaction is carried out at a temperature in the range from 60 to 70° C. When the reaction is complete (as evidenced by the fact that the amine number remains constant), the excess amine is stripped off in vacuo. The ethoxylation and/or propoxylation of the intermediate obtained as described takes place under standard conditions (typically KOH-catalyzed).

Compounds (III)

The alcohols (III) have the formula $R^4$—OH, in which $R^4$ is an alkyl group having 6 to 18 carbon atoms. $R^4$ may be linear, branched or cyclic, and also saturated, or olefinically mono- or polyunsaturated.

The alcohols (III) are monofunctional alcohols which have only one free OH group per molecule, preferably on a terminal position. Branched alcohols (III) are preferred.

Very particularly preferred alcohols (III) are Guerbet alcohols. These are known to the person skilled in the art and are obtained by the so-called Guerbet reaction, a dimerization reaction known for more than 100 years, which proceeds according to the following equation:

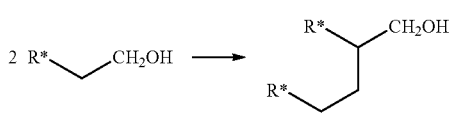

In this process, a primary aliphatic alcohol is converted into a (dimerized) primary alcohol, which is alkylated in the beta position relative to the carbon atom which carries the OH group. The Guerbet reaction proceeds in the presence of a catalyst at elevated temperature with the elimination of water, and constitutes a simple option for converting linear alcohols into branched alcohols. In the above equation, R* is an aliphatic group. This may be linear or branched. Typically, only one alcohol is used in the Guerbet reaction. However, it is also possible to use two different primary aliphatic alcohols; in this case, the term "mixed Guerbet reaction" is used. Historically the first reaction of the stated type was published by Marcel Guerbet as early as 1899, when he reported the dimerization of n-butanol to 2-ethylhexan-1-ol.

In one embodiment, alcohols (III) are used which satisfy the formula (III-a):

(III-a)

in which:
R is $HO—CH_2—(CH_2)_k—$, where k=0 to 4
$R^1$ is $CH_3—(CH_2)_m—$, where m=4 to 14
$R^2$ is $CH_3—(CH_2)_n—$, where n=2 to 10
$R^3$ is selected from the group consisting of H—, $CH_3$— and $C_2H_5$—.

Examples of particularly suitable alcohols (III-a) are, for example, Guerbet alcohols of the ISOFOL® series from Condea, such as 2-(n-butyl)octan-1-ol. Other suitable Guerbet alcohols are those which are obtained by dimerization of isoamyl alcohols, such as 3-methylbutan-1-ol.

The Preparation of the Compounds (V)

The reaction of the compounds (I), (II) and (III), or (I) and (II) to give the compounds (V) to be used according to the invention preferably takes place in the presence of a catalyst. Examples of suitable catalysts include, without limitation, trifluoromethanesulfonic acid and ANCHOR® 1040. The reaction of the compounds (I), (II) and (III), or (I) and (II) to give the compounds (V) to be used according to the invention preferably takes place at a temperature in the range from 50 to 200° C., and in particular in the range from 100 to 180° C.

Preferably, within the scope specified above, the ratio of the reactants (I) and (II) is selected such that all of the oxirane groups in the epoxide (I) react fully. This means in practice a stoichiometric ratio of the sum of the OH groups of the reactants and of the sum of the oxirane groups of the reactants, or a ratio with a slight excess of OH groups in the range from about 5 to 10% (i.e. sum of the OH groups of the reactants to the sum of the oxirane groups of the reactants=1:(1.05 to 1.10)).

Thickener Concentrates

The invention further provides thickener concentrates comprising:
(i) water,
(ii) one or more of the thickeners (V) described above, and
(iii) optionally, one or more organic solvents and/or nonionic surfactants of the type of the addition compounds of ethylene oxide and/or propylene oxide onto fatty alcohols having 8 to 22 carbon atoms.

Component (ii) is described above under the thickeners (V).

The organic solvents (iii) are volatile organic solvents. Examples thereof include, without limitation, low molecular weight alcohols such as methanol, ethanol, n-propanol, isopropanol, n-butanol, isobutanol, sec-butanol, ethanediol, propanediol, butanediol, glycerol, and trimethylolpropane.

Preferred nonionic surfactants include the addition compounds of ethylene oxide and/or propylene oxide onto fatty alcohols having 8-18 carbon atoms (iii), particularly with 2 to 4 mol of ethylene oxide per mole of fatty alcohol, for example DEHYDOL® O4 (commercial product of Cognis).

Furthermore, the invention relates to the use of the thickeners or thickener concentrates for thickening aqueous systems, preferably aqueous dispersions, selected from the group consisting of aqueous automotive finishes and industrial coatings, printing and textile inks, pigment printing pastes, aqueous pharmaceutical cosmetic formulations, crop protection formulations, filler and pigment dispersions, preparations of detergents, adhesives, waxes and polishes, and also for petroleum recovery, in particular for thickening aqueous colored renderings and paints in dispersion form.

What is claimed is:
1. A compound obtained by reacting:
   (a) epoxides (I) which comprise two or three epoxide groups per molecule, with
   (b) compounds of the structure (II)

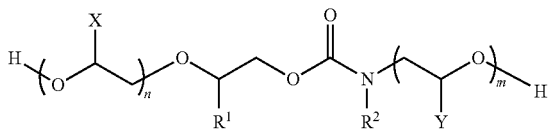

(II)

in which:
   $R^1$ is hydrogen, C1-C3 alkyl, or $R^3$
   $R^2$ is linear, branched or cyclic, saturated or olefinically mono- or polyunsaturated C2-C22 alkyl,
   $R^3$ is saturated C1-C3 alkyl substituted on one of the carbon atoms with —O—($CH_2$—CHZ—O)$_p$—H,
   X, Y and Z, independently are hydrogen or methyl,
   n, m and p, independently are numbers in the range from 0 to 45, provided that at least one of n, m and p must be greater than zero, and further provided that the sum n+m+p must be in the range from 2 to 70, and
   (c) alcohols (III) of the formula $R^4$—OH, in which $R^4$ is C6-C22 alkyl, with the proviso that the molar ratio of the reactants (I):(II):(III) is in the range from 1:(1 to 3):(0.05 to 1.95), and wherein the reaction is carried out at a temperature in the range from 50 to 200° C. and in the presence of a catalyst.

2. The compound of claim 1, wherein component (c) comprises a Guerbet alcohol.

3. The compound of claim 2, wherein said Guerbet alcohol comprises 2-(n-butyl)octan-1-ol.

4. A thickener concentrate comprising:
   (i) water,
   (ii) one or more compounds as claimed in claim 1, and
   (iii) optionally, one or more organic solvents and/or nonionic surfactants comprising addition compounds of ethylene oxide and/or propylene oxide and C8-C22 fatty alcohols.

5. A method of thickening a composition, comprising adding the compound of claim 1 to said composition as a thickener.

6. The compound of claim 1, wherein the all of the oxirane groups in the epoxide (I) react fully.

* * * * *